US012441116B2

(12) United States Patent
Tsuji

(10) Patent No.: US 12,441,116 B2
(45) Date of Patent: Oct. 14, 2025

(54) CONNECTION MECHANISM FOR A LIQUID FLOW PASSAGE, AND INK-JET RECORDING APPARATUS

(71) Applicant: KYOCERA Document Solutions Inc., Osaka (JP)

(72) Inventor: Kikunosuke Tsuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 166 days.

(21) Appl. No.: 18/577,509

(22) PCT Filed: Jul. 7, 2022

(86) PCT No.: PCT/JP2022/026938
§ 371 (c)(1),
(2) Date: Jan. 8, 2024

(87) PCT Pub. No.: WO2023/286688
PCT Pub. Date: Jan. 19, 2023

(65) Prior Publication Data

US 2024/0239108 A1 Jul. 18, 2024

(30) Foreign Application Priority Data

Jul. 16, 2021 (JP) ................................ 2021-117836

(51) Int. Cl.
*B41J 2/175* (2006.01)

(52) U.S. Cl.
CPC ....... *B41J 2/17523* (2013.01); *B41J 2/17596* (2013.01)

(58) Field of Classification Search
CPC . B41J 2/01; B41J 2/175; B41J 2/17503; B41J 2/17506; B41J 2/17509; B41J 2/17513; B41J 2/17523; B41J 2/17596; F16L 37/40; A61M 39/24
See application file for complete search history.

(56) References Cited

U.S. PATENT DOCUMENTS

| | | | | |
|---|---|---|---|---|
| 5,402,826 A * | 4/1995 | Molnar | ................. | B05B 5/1616 137/614.01 |
| 2019/0344574 A1 | 11/2019 | Maeshima | ........... | B41J 2/17513 |
| 2020/0122472 A1 * | 4/2020 | Maeshima | ........... | B41J 2/17556 |
| 2021/0060961 A1 * | 3/2021 | Maeshima | ............ | A61M 39/24 |

FOREIGN PATENT DOCUMENTS

JP 2019-198984 A 11/2019

* cited by examiner

*Primary Examiner* — Anh T Vo
(74) *Attorney, Agent, or Firm* — Stein IP, LLC

(57) ABSTRACT

A second connecting portion (20) includes a main body portion (21), a slide member (22), and a check valve (25). A first connecting portion (10) and the second connecting portion (20) are connected together by inserting a joint portion (101) in the main body portion (21), bringing the joint portion (101) into contact with the slide member (22), and pressing the slide member (22) inward in a direction toward the check valve (25). When the joint portion (101) is removed, the slide member (22) moves away from the check valve (25) while in contact with the joint portion (101).

3 Claims, 8 Drawing Sheets

CONNECTION MECHANISM FOR A LIQUID FLOW PASSAGE, AND INK-JET RECORDING APPARATUS

CROSS-REFERENCE TO RELATED APPLICATIONS

This application is a national stage of International Application No. PCT/JP2022/026938, filed Jul. 7, 2022, which claims the benefit of Japanese Application No. 2021-117836, filed Jul. 16, 2021, in the Japanese Patent Office, the disclosures of which are incorporated herein by reference.

TECHNICAL FIELD

The present invention relates to a connection mechanism for a liquid flow passage, and to an ink-jet recording apparatus that includes such a connection mechanism.

BACKGROUND ART

Conventional ink-jet recording apparatuses use ink (liquid) stored in a container (see, for example, Patent Document 1). The container is removably mounted in an apparatus main body. The apparatus main body and the container each include a liquid flow passage through which ink flows. The apparatus main body and the container each also has a connecting portion. The connecting portions of the apparatus main body and the container are connected together to form a continuous ink flow passage.

CITATION LIST

Patent Literature

Patent Document 1: JP-A-2019-198984

SUMMARY OF INVENTION

Technical Problem

When the ink in the container runs out, the container is replaced. That is, the connecting portion of the container is removed from the connecting portion of the apparatus main body. Here, residual ink may be attached to the connecting portion of the container. In that case, the residual ink splashes, and this inconveniently ends in soiling the hands of an operator replacing the container. It may also soil the apparatus with ink inside.

Devised in view of the problems above, the present invention is aimed at providing a connection mechanism for a liquid flow passage that can prevent residual ink from splashing when a container is removed from an apparatus main body. The present invention is also aimed at providing an ink-jet recording apparatus having such a connection mechanism.

Solution to Problem

To solve the above problem, according to a first aspect of the present invention, a connection mechanism for a liquid flow passage between an apparatus main body and a container that stores liquid to be fed to the apparatus main body and that is removably mounted in the apparatus main body includes: a first connecting portion that is provided in the container and that has a liquid flow passage inside it; and a second connecting portion that is provided in the apparatus main body and that has a liquid flow passage inside it. The second connecting portion has the first connecting portion removably fitted to it. The first connecting portion includes a joint portion that has a liquid flow passage inside it. The second connecting portion includes a main body portion, a cylindrical slide member that is arranged in the main body portion so as to be reciprocatable along a liquid feeding direction and that forms a liquid flow passage, and a check valve that is arranged in a part of the interior of the main body portion downstream of the slide member in the liquid feeding direction to prevent backflow of the liquid. By inserting the joint portion in the main body portion, bringing the joint portion into contact with an upstream-side end part of the slide member in the liquid feeding direction, and pressing the slide member inward in a direction toward the check valve, the liquid flow passages in the first and second connecting portions are connected together. When the joint portion is removed from the main body portion, the slide member moves in a direction away from the check valve while in contact with the joint portion.

According to a second aspect of the present invention, an ink-jet recording apparatus includes the above description connection mechanism for a liquid flow passage. The liquid is ink. The apparatus main body performs image formation using the ink.

Advantageous Effects of Invention

With a configuration according to the present invention, it is possible to prevent residual ink from splashing when a container is removed from an apparatus main body.

DESCRIPTION OF EMBODIMENTS

<Outline of the Construction of an Ink-Jet Recording Apparatus>

Figure 1:
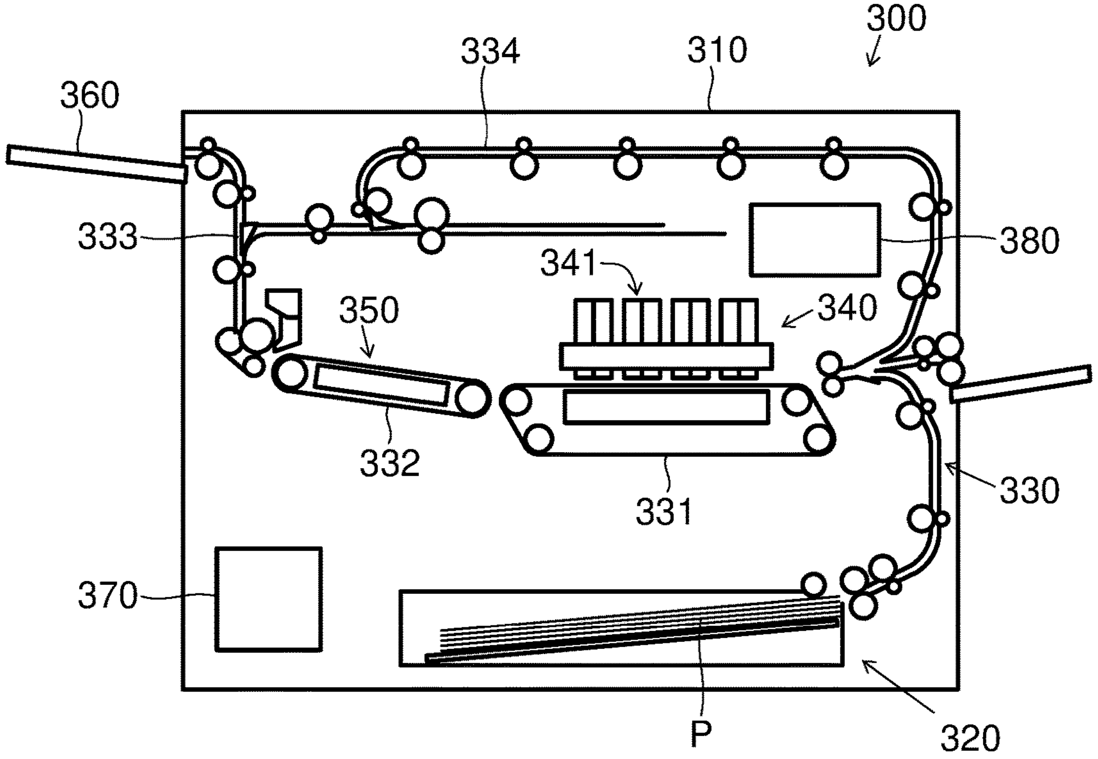
FIG. 1 is a schematic diagram of an ink-jet recording apparatus according to one embodiment of the present invention.

As shown in FIG. 1, an ink-jet recording apparatus 300 according to an embodiment is a printer of an ink-jet recording type. The ink-jet recording apparatus 300 includes an apparatus main body 310, a sheet feeding portion 320, a sheet conveying portion 330, a recording portion 340, a drying portion 350, a sheet discharge portion 360, and a control portion 370.

The sheet feeding portion 320 stores sheets P (recording medium). The sheet feeding portion 320 feeds out the sheets P one after another. The sheet conveying portion 330 conveys a sheet S fed out from the sheet feeding portion 320 to the recording portion 340 and then to the drying portion 350. The recording portion 340 performs recording (image formation) on the sheet P. The sheet conveying portion 330 discharges the recorded sheet P onto the sheet discharge portion 360.

The sheet conveying portion 330 includes a first belt conveying portion 331 and a second belt conveying portion 332. The first and second belt conveying portions 331 and 332 each have an endless belt that is stretched so as to be circulatable. The first and second belt conveying portions 331 and 332 each hold the sheet P by suction on the outer surface of the belt. In this state the belt circulates to convey the sheet P.

When duplex recording is performed, the sheet conveying portion 330 switches, with a branch portion 333, the conveying direction of the sheet P having undergone recording on one side to a reversing conveying portion 334. The reversing conveying portion 334 switches back the sheet P to move it back to upstream of the recording portion 340 in the sheet conveying direction. As a result, the sheet P has its sides reversed. The sheet conveying portion 330 conveys the sheet P having its sides reversed to the recording portion 340 and then to the drying portion 350.

The recording portion 340 is arranged above the first belt conveying portion 331. The recording portion 340 faces the sheet P conveyed by the first belt conveying portion 331 (belt) across a predetermined gap. The recording portion 340 has a line recording head 341 of an ink-jet type.

Figure 2:
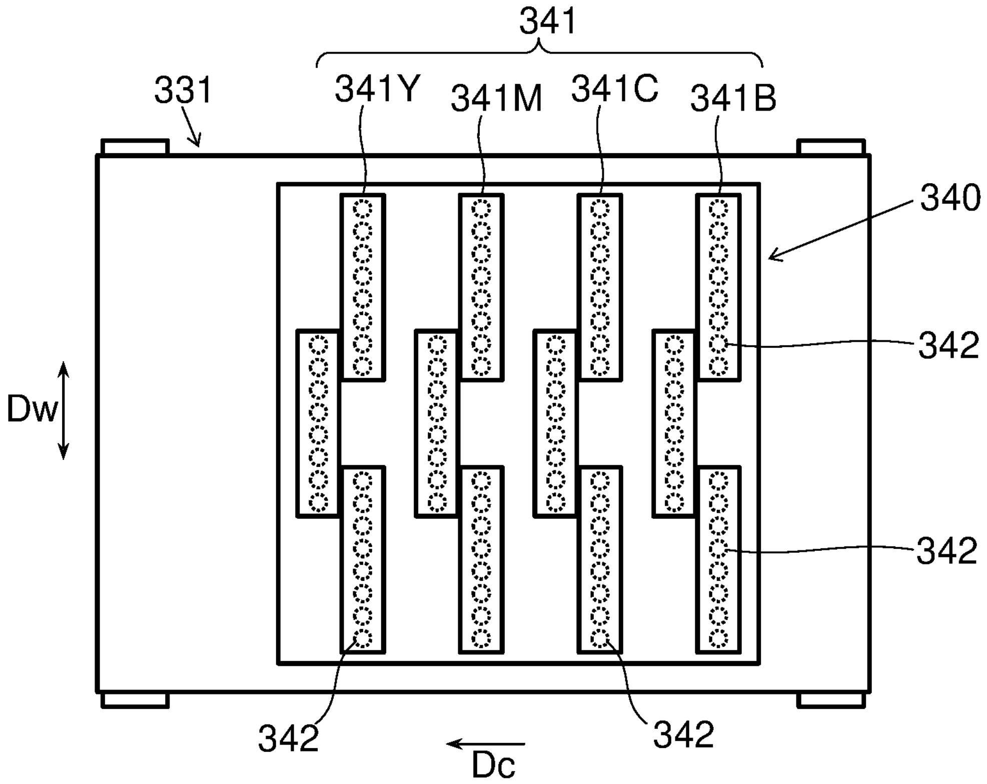
FIG. 2 is a plan view of a recording portion in the ink-jet recording apparatus in FIG. 1.

The recording head 341 includes, as shown in FIG. 2, a plurality of (for example, three) sets of recording heads 341B, 341C, 341M, and 341Y corresponding to four colors, namely black, cyan, magenta, and yellow. The three recording heads 341 for each color are arranged in a staggered formation along the sheet width direction Dw perpendicular to the sheet conveying direction Dc.

The recording head 341 has, in an ink ejection portion at its bottom, a plurality of ink ejecting nozzles 342. The plurality of ink ejecting nozzles 342 are arranged in the sheet width direction Dw. The recording portion 340 ejects ink toward the sheet P conveyed by the first belt conveying portion 331 from the recording heads 341B, 341C, 341M, and 341Y sequentially. Thus, a full-color or monochrome image is recorded on the sheet P.

As shown in FIG. 1, the drying portion 350 is arranged downstream of the recording portion 340 in the sheet conveying direction. The second belt conveying portion 332 conveys a sheet P in the drying portion 350. The drying portion 350, while the sheet P is being conveyed by the second belt conveying portion 332, dries the ink attached to the sheet P.

Although not illustrated, the control portion 370 includes various electronic circuits and electronic components such as a processing circuit (e.g. CPU) and a storage device (e.g. ROM and RAM). The control portion 370 controls the operation of different components in the ink-jet recording apparatus 300 based on a control program and control data. The sheet feeding portion 320, the sheet conveying portion 330, the recording portion 340, and the drying portion 350 individually receive instructions from the control portion 370 and coordinate to perform recording on the sheet P.

The ink-jet recording apparatus 300 includes an ink feeding portion 380. For example, the ink feeding portion 380 is arranged above the recording portion 340.

Figure 3:
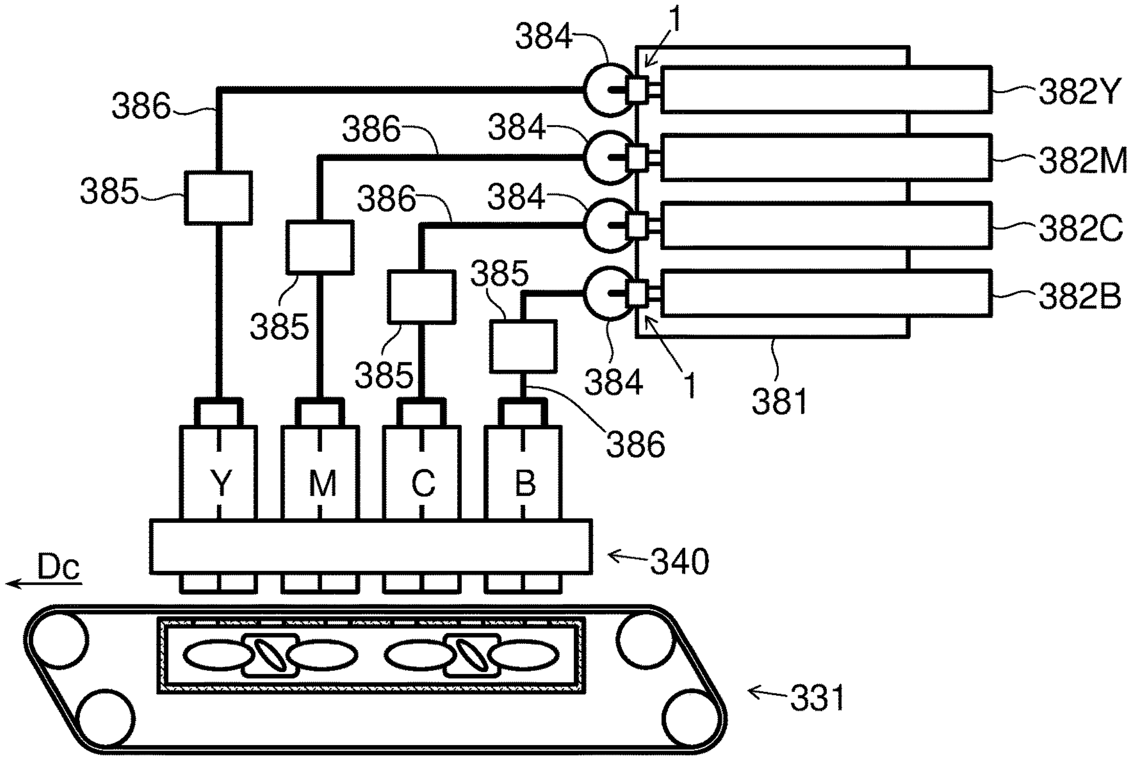
FIG. 3 is a schematic diagram of an ink feeding portion in the ink-jet recording apparatus in FIG. 1.
Figure 4:
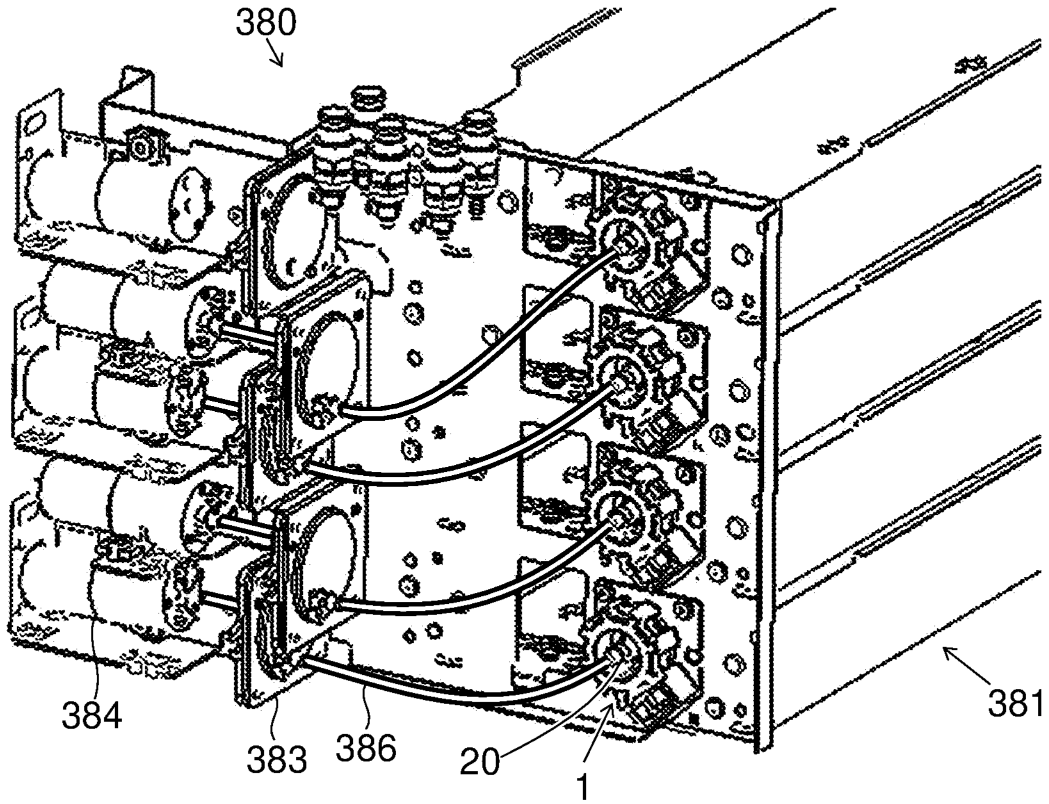
FIG. 4 is a perspective view of the ink feeding portion in FIG. 3.

The ink feeding portion 380 includes, as shown in FIGS. 3 and 4, for each of four colors (black, cyan, magenta, and yellow), a connection mechanism 1, a container rack 381, an ink container 382 (corresponding to a "container"), a filter 383, a suction pump 384, and a sub-ink tank 385. Hereinafter, unless distinction is needed, suffixes ("B", "C", "M", and "Y") distinguishing different colors are often omitted.

The container rack 381 accommodates the ink container 382. The ink container 382 is removably mounted in the container rack 381. That is, the ink container 382 is removably mounted in the apparatus main body 310.

The ink container 382 stores ink (corresponding to "liquid") to be supplied to the apparatus main body 310. The ink in the ink container 382 is sucked by the suction pump 384 to be fed, via the filter 383 and the suction pump 384, to the sub-ink tank 385.

Figure 5:
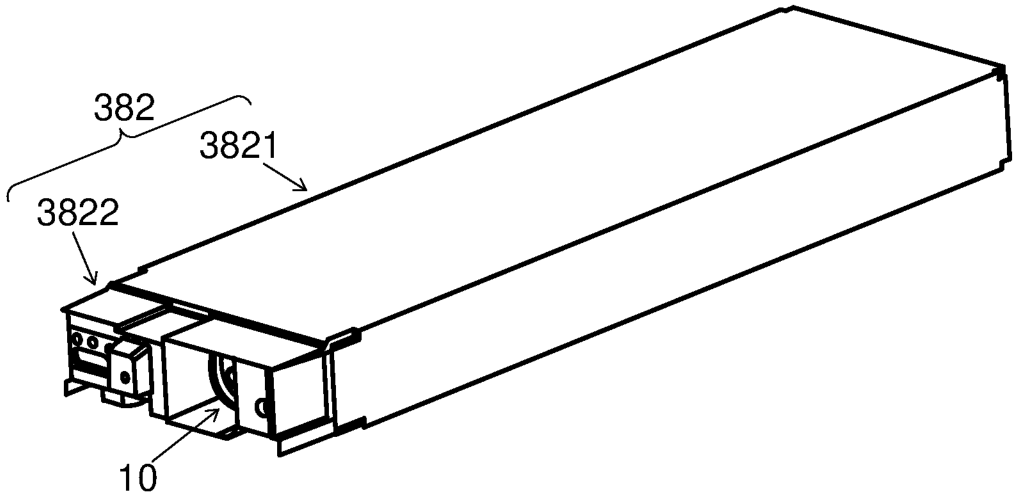
FIG. 5 is a perspective view of an ink container in the ink feeding portion in FIG. 3.

The ink container 382 is, as shown in FIG. 5, a box in the shape of a rectangular parallelepiped, and is composed of an ink pack housing portion 3821 and an ink outflow portion 3822. The ink container 382 accommodates an ink pack (not shown). Ink is sealed in the ink pack.

The ink pack housing portion 3821 is a square tubular member that is open at one end and closed at the other end in its longitudinal direction. The ink pack housing portion 3821 is made of, for example, a sheet of cardboard. The ink pack is accommodated in the ink pack housing portion 3821.

The ink outflow portion 3822 is fitted to one end of the ink pack housing portion 3821 in the longitudinal direction to close the opening of the ink pack housing portion 3821. The ink outflow portion 3822 is formed of synthetic resin such as polyethylene. The ink outflow portion 3822 is fixed to the ink pack housing portion 3821 using adhesive tape or the like.

As shown in FIG. 3, the connection mechanism 1 connects together the container rack 381 and the ink container 382. The connection mechanism 1 constitutes an ink flow passage (corresponding to a "liquid flow passage") between the container rack 381 and the ink container 382. In other words, the connection mechanism 1 is a connection mechanism for the ink flow passage between the container rack 381 and the ink container 382. In yet other words, the connection mechanism 1 is a connection mechanism for the ink flow passage between the apparatus main body 310 and the ink container 382. The structure of the connection mechanism 1 will be described in detail later.

To the connection mechanism 1, an ink supply tube 386 is connected. The ink supply tube 386 leads from the connection mechanism 1 to the recording head 341 via the filter 383, the suction pump 384, and the sub-ink tank 385 in this order. The ink in the ink container 382 is fed from the connection mechanism 1 via the ink supply tube 386 to the recording head 341.

The suction pump 384 is, for example, a diaphragm pump. The suction pump 384 sucks the ink from the ink container 382 and feeds it to the sub-ink tank 385. The sub-ink tank 385 temporarily stores the ink and feeds it to the recording head 341.

<Structure of the Connection Mechanism>

Figure 6:
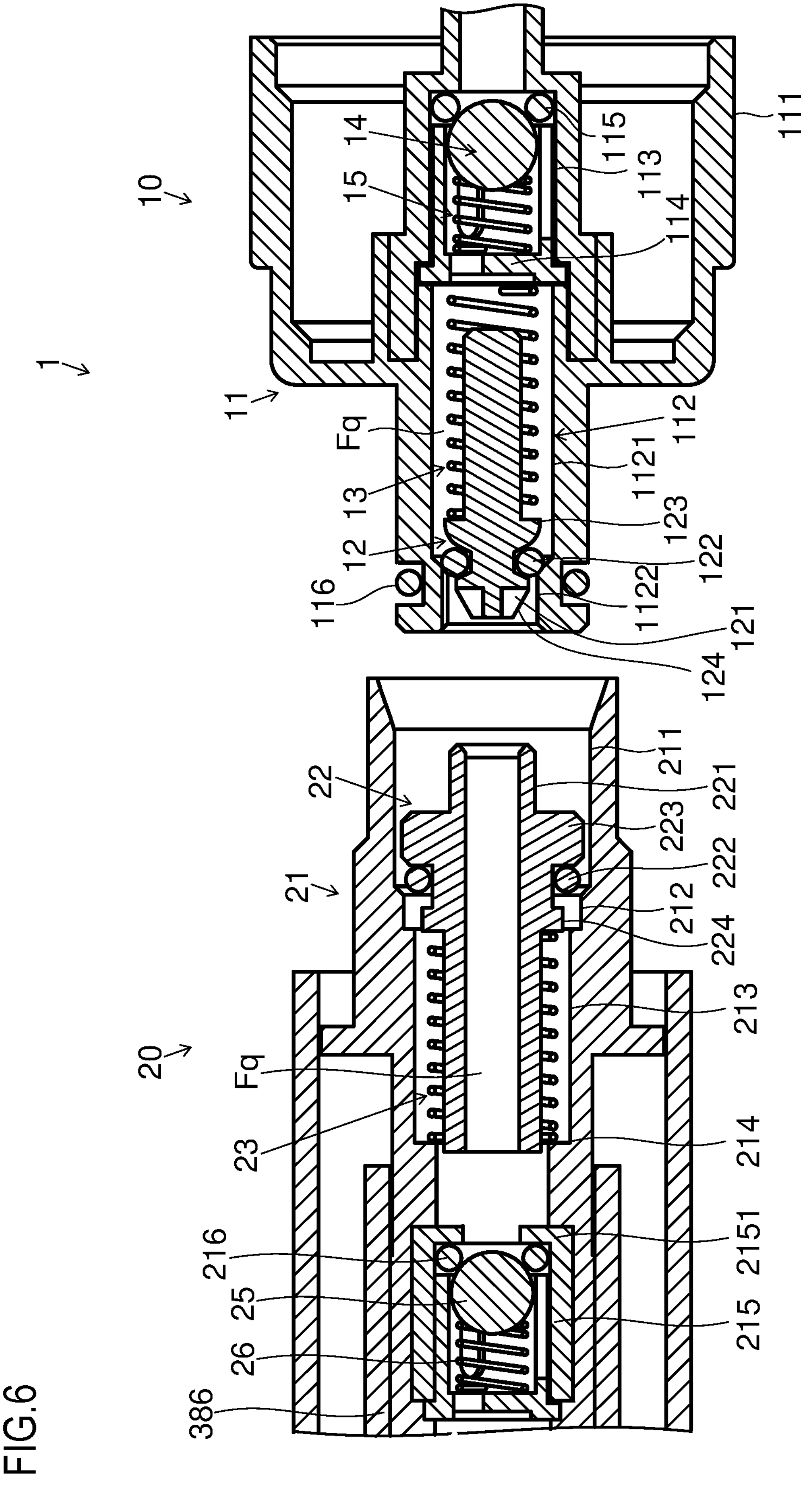
FIG. 6 is a sectional view of a connection mechanism for an ink flow passage according to one embodiment of the present invention.
Figure 7:
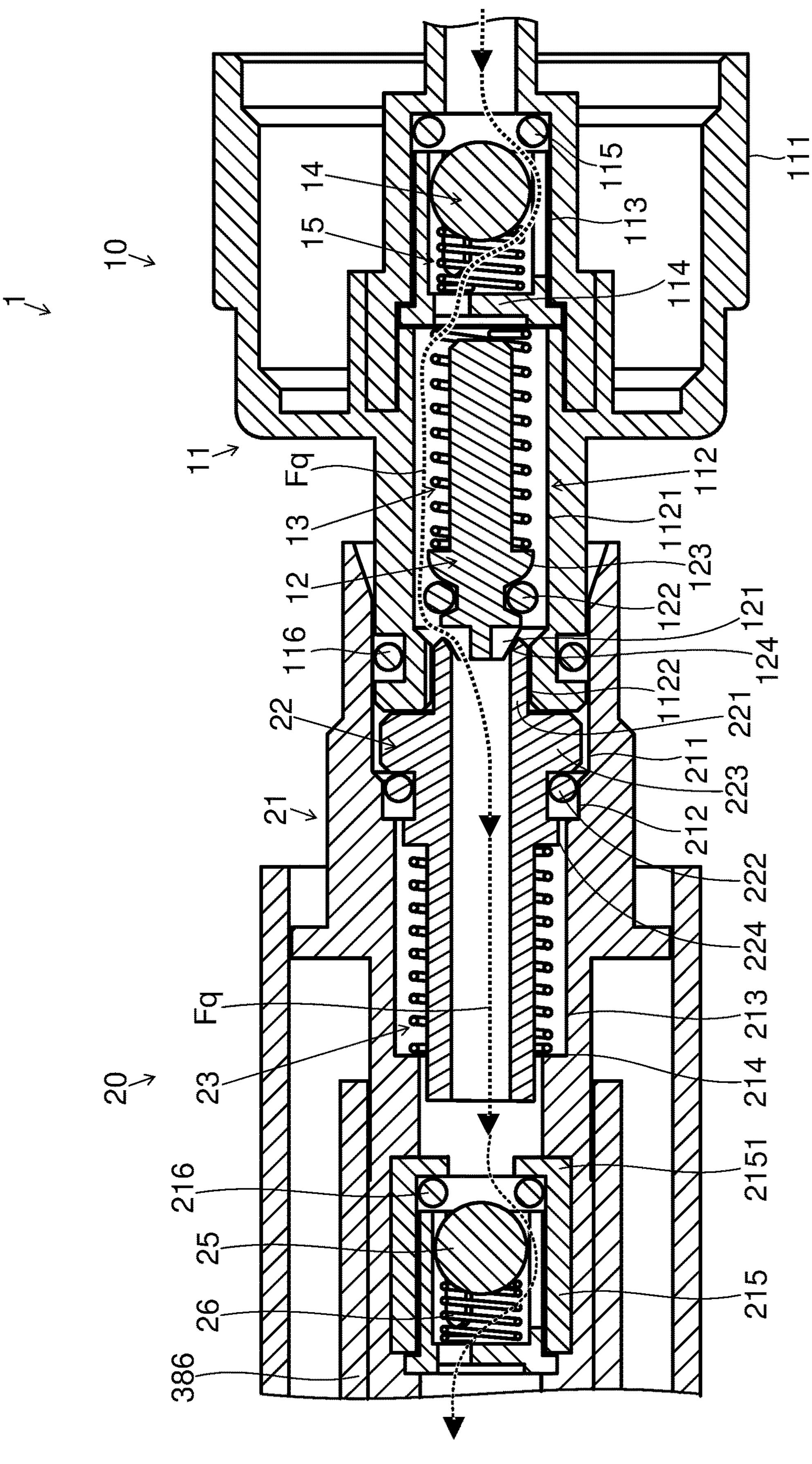
FIG. 7 is a diagram showing the ink flow passage in FIG. 6 connected.
Figure 8:
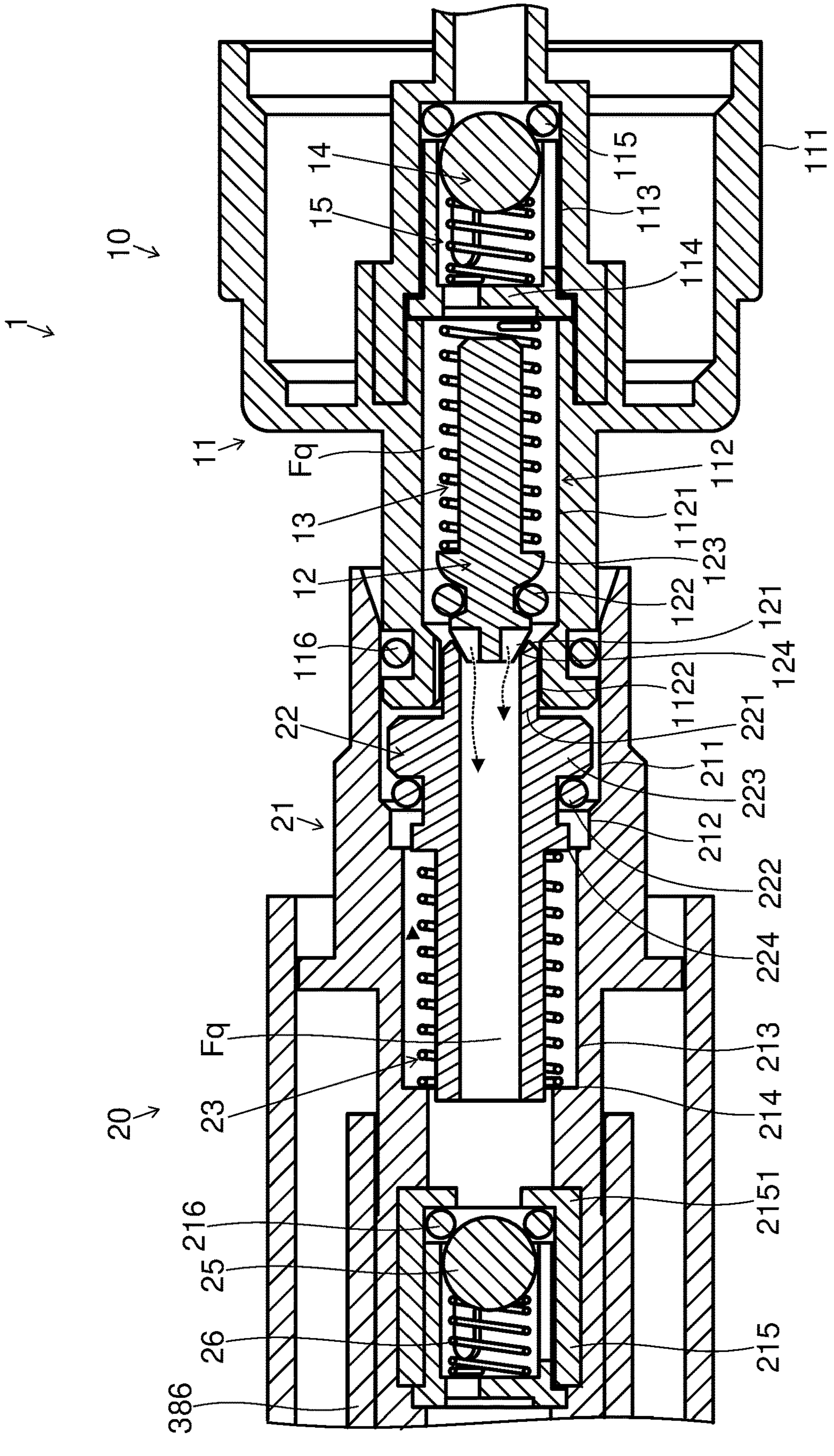
FIG. 8 is a diagram showing the ink flow passage in FIG. 6 disconnected.

Now, the connection mechanism 1 will be described with reference to FIGS. 6 to 8. In FIGS. 6 to 8, the ink flow passage is identified by the reference sign "Fq". FIG. 6 shows a state where the ink container 382 is disconnected from the apparatus main body 310 (container rack 381). FIG. 7 shows a state where the ink container 382 is connected to the apparatus main body 310 (container rack 381). FIG. 8 shows a state observed at one point while the ink container 382 is being removed from the apparatus main body 310 (container rack 381).

In the state shown in FIG. 7, the ink flow passage Fq in the apparatus main body 310 (container rack 381) and that in the ink container 382 are connected together to make a continuous ink flow passage Fq. When, from the state shown in FIG. 7, the ink container 382 is slightly moved upstream in an ink feeding direction, the state changes as shown in FIG. 8. In the state shown in FIG. 8, the ink flow passage Fq in the apparatus main body 310 (container rack 381) and the ink flow passages Fq in the ink container 382 are not completely separated. In FIGS. 7 and 8, the flow of ink is indicated by broken line arrows.

The connection mechanism 1 forms the ink flow passage Fq between the apparatus main body 310 (container rack 381) and the ink container 382. In other words, the connection mechanism 1 is arranged between the apparatus main body 310 (container rack 381) and the ink container 382. Providing the connection mechanism 1 between the apparatus main body 310 (container rack 381) and the ink container 382 allows circulation of ink between them.

The connection mechanism 1 includes a first connecting portion 10 and a second connecting portion 20. The second connecting portion 20 corresponds to a "connecting portion" according to the present invention. The first connecting portion 10 is provided in the ink container 382. The second connecting portion 20 is provided in the apparatus main body 310 (container rack 381). The first and second connecting portions 10 and 20 each have an ink flow passage Fq inside it. The ink feeding direction is the direction from the first connecting portion 10 to the second connecting portion 20.

The first connecting portion 10 is provided in the ink outflow portion 3822. The first connecting portion 10 is removably fitted in the second connecting portion 20. The first connecting portion 10 is an outflow port for the ink stored in the ink container 382. The second connecting portion 20 is an outflow port for the ink fed from the ink container 382 to the apparatus main body 310.

The first connecting portion 10 includes a joint portion 101 that projects toward the second connecting portion 20. The joint portion 101 has an ink flow passage Fq inside it. The joint portion 101 is inserted in the second connecting portion 20. Inserting the joint portion 101 in the second connecting portion 20 connects the ink flow passages Fq in the first connecting portion 10 and the second connecting portion 20 together, allowing ink to circulate. In other words, a continuous ink flow passage Fq is formed through the first connecting portion 10 and the second connecting portion 20.

When the ink container 382 is removed (replaced), the ink container 382 is moved in the direction away from the apparatus main body 310 (in the direction from downstream to upstream in the ink feeding direction). That is, the first connecting portion 10 moves in the direction away from the second connecting portion 20. In this way, the joint portion 101 is removed from the second connecting portion 20, and the ink flow passages Fq of the first connecting portion 10 and the second connecting portion 20 are disconnected from each other.

The first connecting portion 10 includes a first main body portion 11, a valve 12, a valve urging member 13, a first check valve 14, and a first urging member 15.

The first main body portion 11 extends in a tubular form along the ink feeding direction. In other words, the first main body portion 11 has a cylindrical part of which the center axis (cylindrical axis) extends in the ink feeding direction. The first main body portion 11 has an ink flow passage Fq inside it. The interior of the tubular member that forms the first main body portion 11 is the ink flow passage Fq.

The first main body portion 11 includes a container coupling portion 111, a valve accommodating portion 112, a check valve accommodating portion 113, a partition wall portion 114, a seal member 115, and a seal member 116.

The container coupling portion 111 is formed in a cylindrical form of which the center axis (cylindrical axis) extends in the ink feeding direction. The container coupling portion 111 has, for example, a screw portion (not shown) on the inner circumferential face, and is fastened to the ink outflow portion 3822 by a screw.

The valve accommodating portion 112 and the check valve accommodating portion 113 are both formed in a cylindrical shape of which the center axis (cylindrical axis) extends in the ink feeding direction. The valve accommodating portion 112 and the check valve accommodating portion 113 are arranged in this order from downstream to upstream in the ink feeding direction. The valve 12 and the valve urging member 13 are accommodated in the valve accommodating portion 112 (that is, in the first main body portion 11). The first check valve 14 and the first urging member 15 are accommodated in the check valve accommodating portion 113 (that is, in the first main body portion 11). The ink flow passage Fq in the first connecting portion 10 is formed by the internal spaces in the valve accommodating portion 112 and the check valve accommodating portion 113.

The valve accommodating portion 112 has a large inner diameter portion 1121 and a small inner diameter portion 1122. The large inner diameter portion 1121 has a larger inner diameter than the small inner diameter portion 1122. The inner diameter of the large inner diameter portion 1121 is larger than the outer diameter of a seal member 122, described later. The inner diameter of the small inner diameter portion 1122 is smaller than the outer diameter of the seal member 122.

The large inner diameter portion 1121 and the small inner diameter portion 1122 are formed continuously in this order from upstream to downstream in the ink feeding direction. A downstream-side end part of the small inner diameter portion 1122 in the ink feeding direction is a downstream-side end part of the first main body portion 11 and the valve accommodating portion 112 in the ink feeding direction. The downstream-side end part of the small inner diameter portion 1122 in the ink feeding direction is open toward the second connecting portion 20.

The partition wall portion 114 is provided between the valve accommodating portion 112 and the check valve accommodating portion 113. The partition wall portion 114 partitions between the valve accommodating portion 112 and the check valve accommodating portion 113 in the ink feeding direction. The partition wall portion 114 has a plurality of holes that penetrate it in the ink feeding direction. Through these holes, the ink circulates between the valve accommodating portion 112 and the check valve accommodating portion 113.

The seal member 115 is arranged in a part of the interior of the check valve accommodating portion 113 upstream of the first check valve 14 in the ink feeding direction. The seal member 115 is, for example, an O-ring made of an elastic material such as rubber. The seal member 115, at its outer circumference, makes close contact with the inner circumferential face of the check valve accommodating portion 113.

The seal member 116 is arranged at the outer circumference of the downstream-side end part of the first main body portion 11 in the ink feeding direction. The seal member 116 is, for example, an O-ring made of an elastic material such as rubber. The seal member 116, at its inner circumference, makes close contact with the outer circumferential face of the first main body portion 11. A downstream-side end part (the part where the seal member 116 is arranged) of the first main body portion 11 in the ink feeding direction constitutes the joint portion 101. Inserting the joint portion 101 in the second connecting portion 20 permits the outer circumference of the seal member 116 to make contact with the inner circumferential face of a second main body portion 21 (large inner diameter portion 211), described later.

The valve 12 is formed substantially in a bar shape that extends along the center axis (cylindrical axis) of the valve accommodating portion 112. The valve 12 is reciprocatable in the valve accommodating portion 112 along the ink feeding direction. The valve 12 has ink passage grooves 121, a seal member 122, and a flange portion 123.

A plurality of ink passage grooves 121 are arranged in the outer circumference of a downstream-side end part of the valve 12 in the ink feeding direction. The plurality of ink passage grooves 121 each extend in the ink feeding direction, and are arrayed at intervals in the circumferential direction of the valve 12. The outer circumference of the downstream-side end part of the valve 12 in the ink feeding direction has an inclined portion 124 of which the diameter is increasingly small from upstream to downstream in the ink feeding direction. The ink passage grooves 121 extend from an upstream-side end part to a downstream-side end part of the inclined portion 124 in the ink feeding direction.

The seal member 122 is arranged on the outer circumference of the valve 12 upstream of the ink passage grooves 121 in the ink feeding direction. The seal member 122 is, for example, an O-ring made of an elastic material such as rubber. The seal member 122, at its inner circumference, makes close contact with the outer circumferential face of the valve 12. The outer diameter of the seal member 122 is smaller than the inner diameter of the large inner diameter portion 1121 of the valve accommodating portion 112 but larger than the inner diameter of the small inner diameter portion 1122 of the valve accommodating portion 112.

The flange portion 123 is provided in a part of the valve 12 upstream of the seal member 122 in the ink feeding direction. The flange portion 123 functions as a holding portion for the valve urging member 13. In other words, the flange portion 123 functions as a part that receives the urging force of the valve urging member 13.

The downstream-side end part of the valve 12 in the ink feeding direction is part of the joint portion 101. The downstream-side end part of the valve 12 in the ink feeding direction, together with the downstream-side end part of the first main body portion 11 in the ink feeding direction, forms the joint portion 101. That is, the downstream-side end part of the valve 12 in the ink feeding direction is inserted in the second connecting portion 20.

The valve urging member 13 is, for example, a compression coil spring. A part of the valve 12 upstream of the flange portion 123 in the ink feeding direction is inserted in a central part of the coil in the valve urging member 13. That is, the valve urging member 13 is held by being fitted on the valve 12.

A downstream-side end part of the valve urging member 13 in the ink feeding direction makes contact with the flange portion 123. An upstream-side end part of the valve urging member 13 in the ink feeding direction makes contact with the partition wall portion 114. This produces an urging force in the valve urging member 13. The valve urging member 13 urges the valve 12 downstream in the ink feeding direction. That is, the valve urging member 13 urges in such a direction as to close the ink flow passage Fq.

The first check valve 14 is formed in a spherical shape. The first check valve 14 is accommodated in the check valve accommodating portion 113. The first check valve 14 is reciprocatable in the ink feeding direction in the check valve accommodating portion 113. The first check valve 14 moves upstream in the ink feeding direction to make contact with the inner circumference of the seal member 115. In this way, the first check valve 14 prevents backflow of ink in the ink flow passage Fq.

The first urging member 15 is, for example, a compression coil spring. The first urging member 15 is arranged downstream of the first check valve 14 in the ink feeding direction. Thus, the first urging member 15 is arranged between the first check valve 14 and the partition wall portion 114.

An upstream-side end part of the first urging member 15 in the ink feeding direction makes contact with the first check valve 14. A downstream-side end part of the first urging member 15 in the ink feeding direction makes contact with the partition wall portion 114. This produces an urging force in the first urging member 15. As a result of the first check valve 14 being urged upstream in the ink feeding direction, the first check valve 14 makes contact with the seal member 115 to close the ink flow passage Fq. Thus, backflow of ink is prevented.

The second connecting portion 20 includes a second main body portion 21, a slide member 22, and a slide urging member 23. The second main body portion 21 corresponds to a "main body portion" according to the present invention. The slide urging member 23 corresponds to an "urging member" according to the present invention.

The second main body portion 21 extends in a tubular form along the ink feeding direction. In other words, the second main body portion 21 has a cylindrical part of which the center axis (cylindrical axis) extends in the ink feeding direction. The second main body portion 21 has an ink flow passage Fq inside it. The interior of the tubular member that forms the second main body portion 21 is the ink flow passage Fq. To a downstream-side end part of the second main body portion 21 in the ink feeding direction, one end of the ink supply tube 386 is fitted.

The second main body portion 21 has inside it a large inner diameter portion 211, a small inner diameter portion 212*a*, an urging member accommodating portion 213, and a stepped part 214.

The large inner diameter portion 211 has a larger inner diameter than the small inner diameter portion 212. The inner diameter of the large inner diameter portion 211 is larger than the outer diameter of a seal member 222, described later. The inner diameter of the small inner diameter portion 212 is smaller than the outer diameter of the seal member 222.

The large inner diameter portion 211 and the small inner diameter portion 212 are formed continuously in this order from upstream to downstream in the ink feeding direction. An upstream-side end part of the large inner diameter portion 211 in the ink feeding direction is an upstream-side end part of the second main body portion 21 in the ink feeding direction. The upstream-side end part of the large inner diameter portion 211 in the ink feeding direction is open toward the first connecting portion 10. Through this opening, the joint portion 101 is inserted in the second connecting portion 20.

The urging member accommodating portion 213 is arranged downstream of the small inner diameter portion 212 in the ink feeding direction, and is formed so as to be continuous with the small inner diameter portion 212. The slide urging member 23 is accommodated in the urging member accommodating portion 213.

The stepped part 214 is formed downstream of the urging member accommodating portion 213 in the ink feeding direction so as to be continuous with the urging member accommodating portion 213. A check valve accommodating portion 215, described later, is provided downstream of the stepped part 214 in the ink feeding direction.

The slide member 22 is arranged in the second main body portion 21. The slide member 22 is formed substantially in a cylindrical shape that extends along the center axis (cylindrical axis) of the second main body portion 21. The slide member 22 is reciprocatable in the ink feeding direction in the second main body portion 21.

The slide member 22 has an ink flow passage Fq inside it. The interior of the tubular member that forms the slide member 22 is the ink flow passage Fq. The slide member 22, together with the second main body portion 21, forms the ink flow passage Fq.

The slide member 22 includes a valve contact portion 221, a seal member 222, a first flange portion 223, and a second flange portion 224.

The valve contact portion 221 is arranged in an upstream-side end part of the slide member 22 in the ink feeding direction. The valve contact portion 221 has an outer diameter smaller than the inner diameter of the downstream-side end part, in the ink feeding direction, of the first main body portion 11 (the small inner diameter portion 1122 of the valve accommodating portion 112), and has an inner diameter larger than the diameter of the downstream-side end part of the valve 12 in the ink feeding direction.

The inner diameter of an upstream-side end part of the valve contact portion 221 in the ink feeding direction equals the diameter of a substantially middle part of the inclined portion 124 in the valve 12 in the ink feeding direction. Thus, when the joint portion 101 is inserted in the second connecting portion 20, the upstream-side end part of the valve contact portion 221 in the ink feeding direction is inserted in the valve accommodating portion 112 (small inner diameter portion 1122). Then, the upstream-side end part of the valve contact portion 221 in the ink feeding direction presses the valve 12 upstream in the ink feeding direction.

The seal member 222 is arranged on a part of the outer circumference of the slide member 22 between the first flange portion 223 and the second flange portion 224. The seal member 222 is, for example, an O-ring made of an elastic material such as rubber. The seal member 222, at its inner circumference, makes close contact with the outer circumferential face of the slide member 22. The outer diameter of the seal member 222 is smaller than the inner diameter of the large inner diameter portion 211 of the second main body portion 21 but larger than the inner diameter of the small inner diameter portion 212 of the second main body portion 21.

In a state where the second connecting portion 20 is not inserted in the joint portion 101, a part of the slide member 22 where the seal member 222 is arranged is located in the large inner diameter portion 211 of the second main body portion 21 in the ink feeding direction. As the joint portion 101 is inserted in the second connecting portion 20, the slide member 22 is pushed in and the slide member 22 moves downstream in the ink feeding direction, with the result that the outer circumference of the seal member 222 makes contact with the inner circumferential face of the small inner diameter portion 212 of the second main body portion 21.

The first flange portion 223 is provided in a part of the slide member 22 downstream of the valve contact portion 221 in the ink feeding direction, upstream of the position where the seal member 222 is arranged in the ink feeding direction. In a state where the second connecting portion 20 is inserted in the joint portion 101, the slide member 22 is pressed by the joint portion 101 downstream in the ink feeding direction. Specifically, the downstream-side end part of the first main body portion 11 in the ink feeding direction presses the first flange portion 223 downstream in the ink feeding direction.

The second flange portion 224 is provided in a part of the slide member 22 downstream of the position where the seal member 222 is arranged in the ink feeding direction. The second flange portion 224 functions as a holding portion for the slide urging member 23. In other words, the second flange portion 224 functions as a part that receives the urging force of the slide urging member 23.

The slide urging member 23 is, for example, a compression coil spring. A part of the slide member 22 downstream of the second flange portion 224 in the ink feeding direction is inserted in a central part of the coil in the slide urging member 23. That is, the slide urging member 23 is held by being fitted on the slide member 22.

An upstream-side end part of the slide urging member 23 in the ink feeding direction makes contact with the second flange portion 224 of the slide member 22. A downstream-side end part of the slide urging member 23 in the ink feeding direction makes contact with the stepped part 214 of the second main body portion 21. This produces an urging force in the slide urging member 23. The slide urging member 23 urges the slide member 22 upstream in the ink feeding direction.

Here, the second connecting portion 20 further includes a second check valve 25. The second check valve 25 corresponds to a "check valve" according to the present invention. The second connecting portion 20 includes a second urging member 26. The second main body portion 21 includes inside it a check valve accommodating portion 215 and a seal member 216.

The check valve accommodating portion 215 is formed in a cylindrical shape of which the center axis (cylindrical axis) extends in the ink feeding direction. The check valve accommodating portion 215 is arranged in a part of the second main body portion 21 downstream of the slide member 22 in the ink feeding direction. Even when the slide member 22 moves downstream in the ink feeding direction, a downstream-side end part of the slide member 22 in the ink feeding direction does not make contact with the check valve accommodating portion 215.

The outer circumferential face (outer face) of the check valve accommodating portion 215, over its entire surface, makes contact with the inner circumferential face (inner face) of the second main body portion 21. Thus, ink does not circulate between the outer circumferential face of the check valve accommodating portion 215 and the inner circumferential face of the second main body portion 21. The interior of the check valve accommodating portion 215 forms an ink flow passage Fq.

The check valve accommodating portion 215 has, in an upstream-side end part of it in the ink feeding direction, a seal supporting portion 2151. In the upstream-side end part of the check valve accommodating portion 215 in the ink feeding direction, the seal supporting portion 2151 projects, all around its circumference, in the radial direction perpendicular to the ink feeding direction.

The seal member 216 is arranged in a part of the interior of the check valve accommodating portion 215 downstream of the seal supporting portion 2151 in the ink feeding direction. The seal member 216 is, for example, an O-ring made of an elastic material such as rubber. The seal member 216, at its outer circumference, makes close contact with the inner circumferential face of the check valve accommodating portion 215.

The second check valve 25 is formed in a spherical shape. The second check valve 25 is accommodated in the check valve accommodating portion 215. The second check valve 25 is reciprocatable in the ink feeding direction in the check valve accommodating portion 215. The second check valve 25 moves upstream in the ink feeding direction to make contact with the inner circumference of the seal member 216. In this way, the second check valve 25 prevents backflow of ink in the ink flow passage Fq.

The second urging member 26 is, for example, a compression coil spring. The second urging member 26 is arranged downstream of the second check valve 25 in the ink feeding direction. The second urging member 26 urges the second check valve 25 upstream in the ink feeding direction. Thus, the second urging member 26 makes contact with the inner circumference of the seal member 216.

Downstream of the second urging member 26 in the ink feeding direction, a supporting portion 27 that supports the second urging member 26 is provided. A downstream-side end part of the second urging member 26 in the ink feeding direction makes contact with the supporting portion 27. The second urging member 26 is arranged between the second check valve 25 and the supporting portion 27. This produces an urging force in the second urging member 26.

In the task of connecting the ink container 382 to the container rack 381, the joint portion 101 is inserted in the second connecting portion 20. That is, the downstream-side end part of the first main body portion 11 in the ink feeding direction (the downstream-side end part of the valve accommodating portion 112 in the ink feeding direction) is inserted in the second main body portion 21. Along with the first main body portion 11, the downstream-side end part of the valve 12 in the ink feeding direction is inserted in the second main body portion 21. Thus, the ink flow passages Fq in the first connecting portion 10 and the second connecting portion 20 are connected together.

Inserting the joint portion 101 in the second connecting portion 21 results in the downstream-side end part of the valve 12 in the ink feeding direction making contact with the upstream-side end part of the slide member 22 in the ink feeding direction. Then, the joint portion 101 is further inserted in the second connecting portion 21.

Thus, the state changes as shown in FIG. 7. That is, the valve 12, against the urging force of the valve urging member 13, moves upstream of the first main body portion 11 in the ink feeding direction. As a result, an ink flow passage Fq is formed through the first connecting portion 10 and the second connecting portion 20.

Specifically, the downstream-side end part of the valve 12 in the ink feeding direction (a substantially middle part of the inclined portion 124 in the ink feeding direction) makes contact with the upstream-side end part (valve contact portion 221) of the slide member 22 in the ink feeding direction. In this state, further inserting the first main body portion 11 results in the seal member 122 being released from contact with the inner circumferential face of the first main body portion 11 (small inner diameter portion 1122). The ink passage grooves 121 extend from the downstream-side end part to the upstream-side end part of the inclined portion 124 in the ink feeding direction. Thus, even when the valve contact portion 221 makes contact with the inclined portion 124, the ink passage grooves 121 function as an ink flow passage Fq. That is, an ink flow passage Fq is formed in the first connecting portion 10.

Furthermore, the downstream-side end part of the first main body portion 11 in the ink feeding direction makes contact with the first flange portion 223. Then, the first main body portion 11 presses the first flange portion 223 downstream in the ink feeding direction. Here, the slide member 22, against the urging force of the slide urging member 23, moves downstream in the ink feeding direction. That is, the slide member 22 is pressed inward in the direction toward the second check valve 25.

As a result, an ink flow passage Fq is formed through the first connecting portion 10 and the second connecting portion 20 (see FIG. 7). Then, as the suction pump 384 operates in this state, due to the suction force of the suction pump 384, the second check valve 25 moves downstream in the ink feeding direction against the urging force of the second urging member 26. Furthermore, due to the suction force of the suction pump 384, the first check valve 14 moves downstream in the ink feeding direction against the urging force of the first urging member 15.

As a result, the ink in the ink container 382 is fed to the apparatus main body 310. In FIG. 7, the flow of ink at this time is indicated by broken line arrows. When no ink is supplied, the suction pump 384 is stopped. When the suction pump 384 stops, the second check valve 25 and the first check valve 14 each move upstream in the ink feeding direction. That is, the ink flow passage Fq is closed. Thus, backflow of ink is prevented.

In the task of disconnecting the ink container 382 from the container rack 381, the joint portion 101 is removed from the second connecting portion 21. That is, the downstream-side end part of the first main body portion 11 in the ink feeding direction (the downstream-side end part of the valve accommodating portion 112 in the ink feeding direction) is removed from the second main body portion 21. Along with the first main body portion 11, the downstream-side end part of the valve 12 in the ink feeding direction is removed from the second main body portion 21. In this way, the ink flow passage Fq in the first connecting portion 10 is disconnected from the ink flow passage Fq in the second connecting portion 20.

Specifically, as the disconnection task proceeds, the first main body portion 11 moves upstream in the ink feeding direction. In other words, the first main body portion 11 moves in the direction away from the slide member 22. In yet other words, the first main body portion 11 moves in such a direction as to remove the pressure against the slide member 22.

Here, along with the first main body portion 11, the slide member 22 moves upstream in the ink feeding direction under the urging force of the slide urging member 23. In other words, the slide member 22 moves in the direction away from the second check valve 25.

At an early stage of the movement of the slide member 22, the state changes as shown in FIG. 8. Specifically, at an early stage of the movement of the slide member 22, the slide member 22 moves upstream in the ink feeding direction while in contact with the joint portion 101. That is, at an early stage of the movement of the slide member 22, the contact between the slide member 22 and the first main body portion 11 is maintained. Similarly, at an early stage of the movement of the slide member 22, also the contact between the slide member 22 and the valve 12 is maintained. As a result, at an early stage of the movement of the slide member 22, the ink flow passage Fq through the first connecting portion 10 and the second connecting portion 20 is continuous.

When the slide member 22 moves upstream in the ink feeding direction, the slide member 22 moves away from the second check valve 25. That is, the distance between the downstream-side end part of the slide member 22 in the ink feeding direction and the second check valve 25 increases.

In this way, as the slide member 22 moves in the direction away from the second check valve 25, the volume of the ink flow passage Fq upstream of the second check valve 25 in the second connecting portion 20 in the ink feeding direction (here, referred to simply as the ink flow passage Fq in the second connecting portion 20) gradually increases. Then, the ink flow passage Fq in the second connecting portion 20 becomes negatively pressured.

When the ink flow passage Fq in the second connecting portion 20 becomes negatively pressured, the residual ink remaining in the joint portion 101 (the first connecting portion 10) is sucked toward the ink flow passage Fq in the second connecting portion 20. That is, while the joint portion 101 is removed from the second connecting portion 20, without the operator taking any special measure, the residual ink in the joint portion 101 is sucked into the ink flow passage Fq in the second connecting portion 20. In FIG. 8, the flow of residual ink is indicated by broken line arrows.

Then, after the residual ink is sucked, the joint portion 101 is completely removed from the second connecting portion 20. In the state where the joint portion 101 is completely removed from the second connecting portion 20, the ink passage grooves 121 in the valve 12 are exposed.

If the residual ink has not been sucked during the removal of the joint portion 101, the joint portion 101 is removed completely from the second connecting portion 20 with the residual ink attached in the ink passage grooves 121 in the valve 12. This can inconveniently end in splashing the residual ink attached in the ink passage grooves 121.

With the configuration according to the embodiment, as described above, when the joint portion 101 is removed from the second connecting portion 20, residual ink is sucked. This helps prevents residual ink from splashing when the ink container 382 is removed from the apparatus main body 310. Suppressing the splashing of residual ink helps prevent an operator replacing the ink container 382 from soiling his or her hands. It is also possible to prevent the apparatus from being soiled with ink inside.

With the configuration according to the embodiment, the slide member 22 is urged by the slide urging member 23; thus, when the joint portion 101 is removed from the second connecting portion 20, it is possible to move the slide member 22 in the direction away from the second check valve 25 easily and reliably.

The embodiments disclosed herein should be understood to be in every aspect illustrative and not restrictive. The scope of the present disclosure is defined not by the description of the embodiments given above but by the appended claims, and should be understood to encompass any modifications made in the sense and scope equivalent to those of the claims.

The invention claimed is:

1. A connection mechanism for a liquid flow passage between an apparatus main body and a container that stores liquid to be fed to the apparatus main body and that is removably mounted in the apparatus main body, the connection mechanism comprising:
- a first connecting portion that is provided in the container and that has the liquid flow passage inside; and
- a second connecting portion that is provided in the apparatus main body and that has the liquid flow passage inside, the second connecting portion having the first connecting portion removably fitted thereto,
- wherein
- the first connecting portion includes a joint portion that has the liquid flow passage inside thereof,
- the second connecting portion includes
  - a main body portion,
  - a cylindrical slide member that is arranged in the main body portion and that is reciprocatable along a liquid feeding direction, the slide member forming the liquid flow passage, and
  - a check valve that is arranged in a part of an interior of the main body portion downstream of the slide member in the liquid feeding direction, the check valve preventing backflow of the liquid,
- the liquid flow passage in the first connecting portion and the liquid flow passage in the second connecting portion are connected together by
  - inserting the joint portion in the main body portion,
  - bringing the joint portion into contact with an upstream-side end part of the slide member in the liquid feeding direction, and
  - pressing the slide member inward in a direction toward the check valve, and
- when the joint portion is removed from the main body portion, the slide member moves in a direction away from the check valve while in contact with the joint portion.

2. The connection mechanism for the liquid flow passage according to claim 1,
- wherein
- the main body portion includes an urging member,
- the urging member urges the slide member upstream in the liquid feeding direction, and
- when the joint portion is removed from the main body portion, the slide member moves under an urging force of the urging member in the direction away from the check valve while in contact with the joint portion.

3. An ink-jet recording apparatus comprising the connection mechanism for the liquid flow passage according to claim 1,
- wherein
- the liquid is ink, and
- the apparatus main body performs image formation using the ink.

* * * * *